May 15, 1951 A. W. MORRIS 2,552,804
FLAT TIRE DOLLY
Filed Dec. 29, 1949
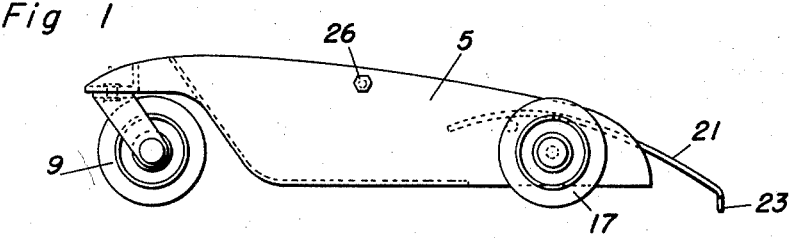
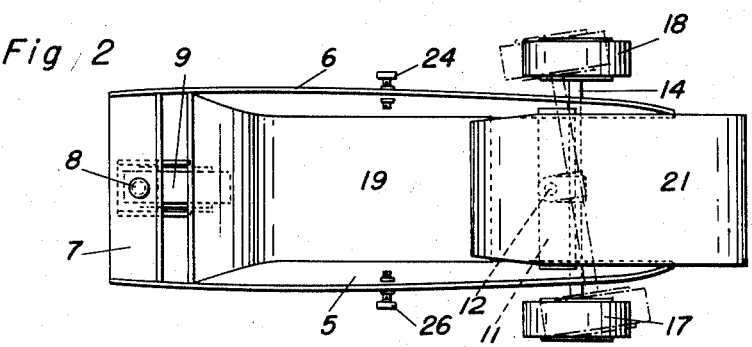
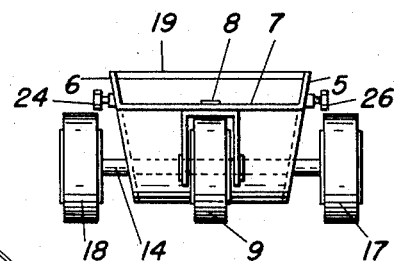
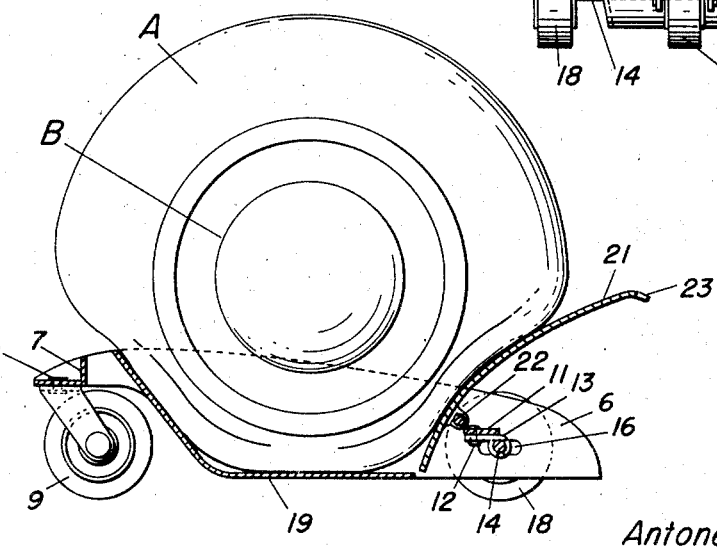
INVENTOR.
Antone W. Morris
BY
Att'y Patented May 15, 1951

2,552,804

UNITED STATES PATENT OFFICE 2,552,804

FLAT TIRE DOLLY

Antone W. Morris, Point Reyes, Calif.

Application December 29, 1949, Serial No. 135,583

1 Claim. (Cl. 214—85)

This invention relates to improvements in dollies and has particular reference to a dolly for use in the moving of a motor vehicle that has a flat tire.

The principal object of this invention is to provide a dolly which is self-tracking and one into which the wheel of a motor vehicle may be driven to a position of rest, after which the dolly acts to support the wheel during the time that the vehicle upon which the wheel is mounted may be driven over the high-way to a point where it may be repaired.

A further object is to produce a device of this character which is easy to place under the wheel, one which is economical to manufacture, and one which may be readily handled by an inexperienced person.

A further object is to provide means for locking the dolly to the wheel so that there is no danger of the wheel jouncing out of the dolly.

Other objects and advantages will be apparent during the course of the following description.

In the accompanying drawings, forming a part of this specification and in which like numerals are used to designate like parts throughout the same, Fig. 1 is a side elevation of my dolly, Fig. 2 is a top-plan view of my dolly, Fig. 3 is a front end elevation, and Fig. 4 is a cross-sectional view of my dolly having a wheel with a deflated tire positioned therein, Applicant is aware of the fact that dollies have been used for transporting various articles, which dollies are usually employed for carrying pallets with goods stacked thereon, or for carrying various articles. These dollies, however, have to be manually pushed and guided.

Applicant has devised a dolly wherein, when a person has a deflated tire, it is only necessary to place the dolly in front of the tire and to drive the vehicle forward so that the tire will roll up a ramp and come to rest in the supporting structure of the dolly, after which the dolly may be locked to the wheel so that, as the vehicle is driven over the highway, there is no danger of the tire and wheel bouncing out of the dolly.

Applicant has also provided means for locking the dolly to the highway or other supporting surface during the time that the tire is being rolled into the dolly, and applicant has also provided means whereby the wheels of the dolly are all arranged so that they will track, thereby preventing any slueing of the car, as will be later described.

Referring to the accompanying drawings wherein, for the purpose of illustration, is shown a preferred embodiment of my invention, the numerals 5 and 6, designate side plates, the forward ends of which are connected by an L-shaped cross brace 7, to which is pivoted, as at 8, a caster wheel 9.

A cross piece 11, serves to space the rear ends of the plates 5 and 6. To this cross piece is pivoted, as at 12, a bearing 13, through which an axle 14, passes, the outer end of the axle extending through slots 16, formed in each of the plates 5 and 6.

Wheels 17 and 18, are rotatably carried on the ends of the axle 14.

A supporting plate 19, is attached to the plates 5 and 6, while a ramp 21, is pivoted, as at 22, between the plates 5 and 6, and is provided with a finger 23, which is adapted to contact the supporting surface, the purpose of which will be later seen.

A deflated tire is shown at A, which is mounted upon an ordinary wheel B.

The result of this construction is that, when a person has a flat tire, it is only necessary to place the dolly in front of the tire, with the finger 23, in contact with the ground or highway surface and directly in front of the wheel having the deflated tire therein. By now driving the vehicle with the deflated tire forwardly, the result will be that the wheel and tire will first engage the ramp 21, and force the finger 23, into the pavement or ground, thus locking the dolly against any possible forward movement. As the vehicle moves forwardly, the tire will roll up the ramp and as the center of the wheel B, passes over the pivot 22, the ramp will tip up from the position shown in Fig. 1, to that shown in Fig. 4, and wheel and tire will come to rest, as shown in Fig. 4.

The user now tightens the clamp bolts 24 and 26 so as to lock the dolly to the rim of the wheel, after which the vehicle may be driven to any desired location where the tire may be repaired.

By pivoting the bearing 13, at a point forward of the axle 14 and by employing a caster wheel 9, it is immaterial whether the dolly be in exact alignment with the wheel alignment, as all of the wheels will caster so as to track perfectly and thus prevent any excessive tendency for side sway, which occurs when rigidly aligned wheels are used.

The openings 16 in the plates 5 and 6, prevent excessive pivotal action of the bearing 13, so that, if one of the wheels strikes a small obstruction, the pivotal action will be limited and will thereafter return to proper tracking.

It will thus be seen that I have produced a dolly which will accomplish all the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

A dolly comprising a pair of spaced plates, spaced across members extending between said plates and serving to hold said plates in substantially vertical position, a single caster wheel pivotally supported by one of said cross members, a vertical pivotally arranged offset bearing carried by the other of said cross members, each of said plates having limiting slots formed therethrough, an axle mounted in said bearing and having its ends extending through said limiting slots, whereby movement of said axle about the vertical pivotal point of said bearing will be limited as to horizontal movement, ground-engaging wheels mounted on the ends of said axle, a wheel-supporting plate positioned between said spaced plates, and a ramp pivoted between said plates at a point to the rear of said wheel-supporting plate, said ramp having ground-engaging fingers whereby contact thereof with the ground will anchor said dolly during loading.

ANTONE W. MORRIS.

REFERENCES CITED

The following references are of record in the file of this patent:

UNITED STATES PATENTS

| Number | Name | Date |
|---|---|---|
| 1,970,159 | Zehnbauer | Aug. 14, 1934 |
| 2,136,019 | Pfau | Nov. 8, 1938 |
| 2,414,383 | Merriam | Jan. 14, 1947 |

FOREIGN PATENTS

| Number | Country | Date |
|---|---|---|
| 465,000 | France | Apr. 4, 1914 |